United States Patent [19]
Brouneus

[11] 3,798,416
[45] Mar. 19, 1974

[54] TEMPERATURE CONTROL SYSTEMS

[75] Inventor: Harold A. Brouneus, Painted Post, N.Y.

[73] Assignee: Corning Glass Works, Corning, N.Y.

[22] Filed: Mar. 28, 1973

[21] Appl. No.: 345,719

[52] U.S. Cl.................. 219/505, 219/494, 219/497, 219/501, 219/504
[51] Int. Cl. ............................................. H05b 1/02
[58] Field of Search ........... 219/494, 497, 499, 501, 219/505, 504

[56] References Cited
UNITED STATES PATENTS

| | | | |
|---|---|---|---|
| 3,067,311 | 12/1962 | Lacy-Hulbert...................... | 219/504 |
| 2,918,558 | 12/1959 | Evans................................. | 219/499 |
| 3,215,818 | 11/1965 | Deaton .............................. | 219/499 |
| 3,546,436 | 12/1970 | Holzier .............................. | 219/504 |

*Primary Examiner*—Bernard A. Gilheany
*Assistant Examiner*—F. E. Bell
*Attorney, Agent, or Firm*—Clarence R. Patty, Jr.

[57] ABSTRACT

Temperature control systems or regulating circuits for use with electrical heating elements of burners of electric ranges, hot plates or cook-tops, such circuits and elements being directly energized from conventional commercial sources of power, such as 60 c.p.s. alternating current sources of 120 or 240 volts, and which systems provide high-temperature sensing and adequate temperature-limiting. Heating elements having linear positive temperature coefficients of electrical resistance are used in conjunction with thermal devices or relays, solid state circuitry including a silicon controlled rectifier as a switch or switching device, and a three winding transformer. The number of components required in the systems disclosed is substantially reduced from those required in previous known systems and an economic advantage is thereby attained. The control systems are especially suitable for use with electrically heated glass-ceramic cook-tops in order to provide improved performance while at the same time providing temperature-limiting of the burner system of the cook-tops for both electric heating-element protection and cook-top protection.

6 Claims, 3 Drawing Figures

3,798,416

TEMPERATURE CONTROL SYSTEMS

BACKGROUND OF THE INVENTION

Until relatively recently, mechanical, electromechanical and/or gaseous fluid components have usually been used as temperature sensing and control devices in temperature control or regulating systems for electric burners or heating elements because no other types of relatively compact and substantially reliable components were available. With the advent of solid state electrical switching devices or components such as silicon controlled rectifiers, it was readily recognized that such components or switching devices could be advantageously used in temperature sensing and control or regulating systems to attain increased compactness without sacrifice of reliability. There were, however, economic drawbacks since said solid state components or devices initially were quite expensive and are still relatively so when compared with corresponding mechanical or electromechanical components and/or devices used in temperature control systems. Accordingly, temperature control or regulating systems using mechanical or electromechanical control devices and components are still used most extensively. The systems of the present invention were, therefore, developed to provide relatively economical temperature control systems using solid-state components or devices where practicable.

SUMMARY OF THE INVENTION

An adequate broad summary of the invention is believed to be set forth in the foregoing abstract of the disclosure and, therefore, for the sake of brevity, and in order to prevent repetition or redundancy, no further summary of the invention is considered necessary or will be given.

BRIEF DESCRIPTION OF THE DRAWINGS

In the drawings.

Similar reference characters refer to similar parts in each of the figures of the drawings.

PREFERRED EMBODIMENTS OF THE INVENTION

Figure 1:
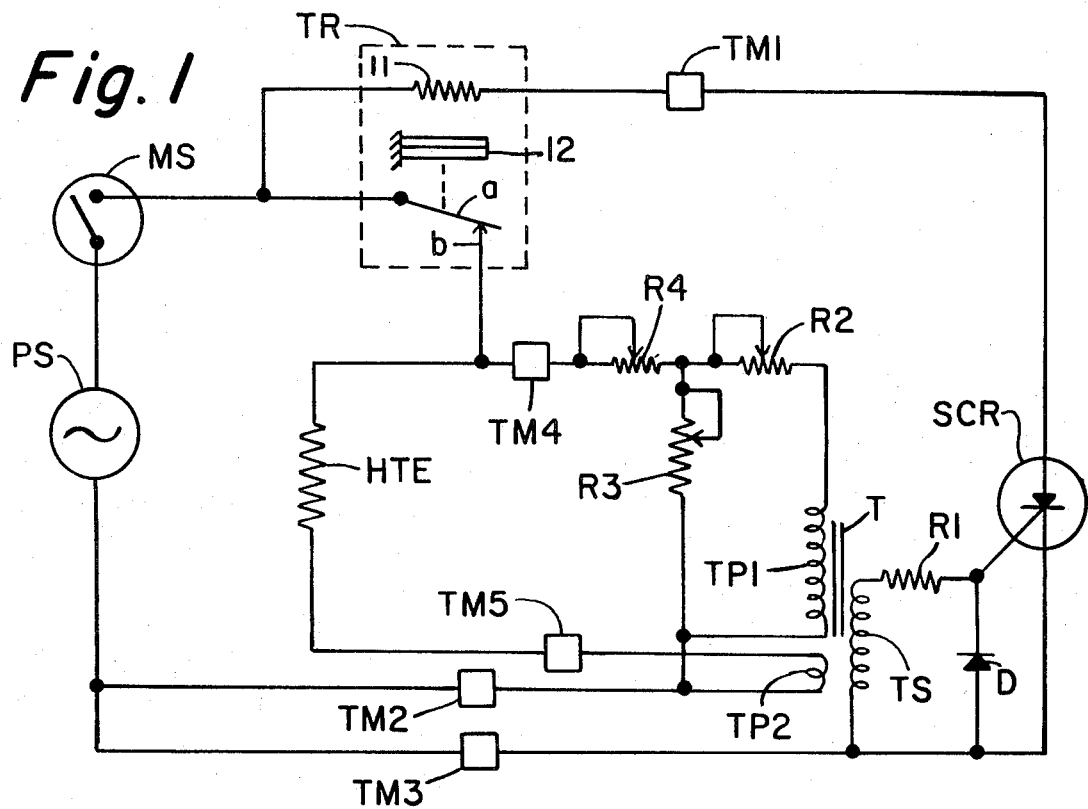
FIG. 1 is a schematic circuit diagram of a first or basic embodiment of the invention suitable for use with a 120 volt 60 c.p.s. source of alternating current.

Referring first to FIG. 1 there is shown a normally open master electric switch MS which has one of its terminals connected with one side or terminal of a power source PS which may, for example, comprise a conventional commercial 120 volt, 60 c.p.s. source of alternating current. The second terminal of switch MS is connected, in multiple, with a movable contact member $a$ of a thermal type relay TR and a first end of a heater winding or coil 11 of such relay. Contact member $a$ of relay TR is normally in contact with a fixed contact member $b$ of such relay, that is, contact member $a$ is closed against fixed contact member $b$ in the so-called released or deenergized condition of relay TR shown in FIG. 1. Contact member $b$ of relay TR is connected, in multiple, with a first end of a 120 volt electrical resistance heating element or coil HTE and over a terminal TM4 to one end of an adjustable resistor R4 to be hereinafter further discussed. The second end of element HTE is connected over a terminal TM5 with a first end of a single turn primary winding TP2 of a transformer T, the second end of such winding connecting over a terminal TM2 with the second side or terminal of previously mentioned power source PS, such second side or terminal of power source PS also connecting with a terminal designated TM3. Element HTE is, for example, the heating element of a burner of an electric range, hotplate or cook-top in conjunction with which the temperature control or regulating system of the present invention is intended to be or may be used and such element has a linear positive coefficient of electrical resistance which increases in value as the temperature of the element increases.

Returning to relay TR, the second end of heater winding or coil 11 of the relay is connected with a terminal TM1. Relay TR further includes a bi-metallic element 12 which is disposed in a thermal transfer relationship adjacent winding 11 of such relay. Element 12 is mechanically connected to the aforesaid movable contact member $a$ of relay TR. Thus, as previously mentioned, contact member $a$ is normally closed against fixed contact member $b$, that is, is in a circuit closing position against such fixed contact member whenever winding 11 is at a sufficiently low temperature or has been deenergized for a sufficient period of time that element 12 operates to actuate contact member $a$ to its position shown. When winding or coil 11 is initially energized, element 12 does not operate to open contacts $a$–$b$ of the relay immediately, but such operation is delayed until winding or coil 11 has been energized for a sufficient period of time to sufficiently heat element 12 for it to operate to open contacts $a$–$b$. Element 12 is provided with a snap-action feature so that it actuates contact $a$ quickly to fully open and fully closed conditions of contacts $a$–$b$ rather than slowly actuate said contact $a$ to creep to the open and closed conditions of contacts $a$–$b$. Thermal relays such as TR and the snap-acting feature of element 12 and its associated contacts, such as $a$–$b$, are old and well known in the art. The heater winding or coil 11 of relay TR may, for example, have a resistance on the order of about 900 ohms.

There is further shown in FIG. 1 an adjustable setpoint electrical resistance unit or potentiometer R2 and a calibrating resistance unit or potentiometer R3 which is preferably linear taper wound. First ends of the windings of potentiometer R2 and R3 connect with each other and with the second end of previously mentioned resistor R4. The second end of potentiometer R2 connects with a first end of primary winding TP1 of a transformer T and the second end of such winding connects in multiple with the second end of potentiometer R3 and previously mentioned terminal TM2. Primary windings TP1 and TP2 of transformer T are wound so that the fluxes induced therein are opposite to each other, that is, are 180° out of phase with each other. Winding TP1 may, for example, be an 1,880 turn winding.

A silicon controlled rectifier SCR is provided and has its anode connected with previously mentioned terminal TM1. The cathode of such rectifier is connected with previously mentioned terminal TM3 and, thereby, to the second side of power source PS. The control electrode of rectifier SCR connects to a first end of a resistor R1 whose second end connects with the first end of a secondary winding TS of transformer T. The second end of such secondary winding is also connected with said terminal TM3. Winding TS of transformer T is wound with respect to winding TP1 of such transformer such that the voltage at the gate of rectifier SCR will be in phase with the SCR anode voltage whenever the ampere-turn product in winding TP2 is less than that in winding TP1. Winding TS may, for example, be a nominal 450 turn winding. A diode or asymmetric unit D is connected in shunt across the control electrode and cathode of rectifier SCR with the low resistance direction of the diode being from the cathode to the control electrode. Such diode protects the SCR gate from damage due to reverse gate voltage.

The following are given as a typical resistance value for component R1 and ranges of adjustable resistance values for the components comprising potentiometers R2 and R3, and the above-mentioned resistor R4.

| Components | Resistance (Ohms) |
| --- | --- |
| R1 | 100 |
| R2 | 5,600–12,000 |
| R3 | 11,000–30,000 |
| R4 | 10,000–20,000 |

In the embodiment of FIG. 1 of the drawings, heating element HTE may be made of a material such that the element has, for example, a resistance of 8 ohms at a temperature of 25° C and a resistance of 12 ohms at a temperature of 450° C. In such case, resistor R4 is adjusted to provide a resistance of 9,100 ohms, potentiometer R2 is adjustable over the nominal range of 5,600 to 10,600 ohms and potentiometer R3 is set to provide a nominal resistance of 25,000 ohms, R1 being, of course, 100 ohms.

Figure 1A:
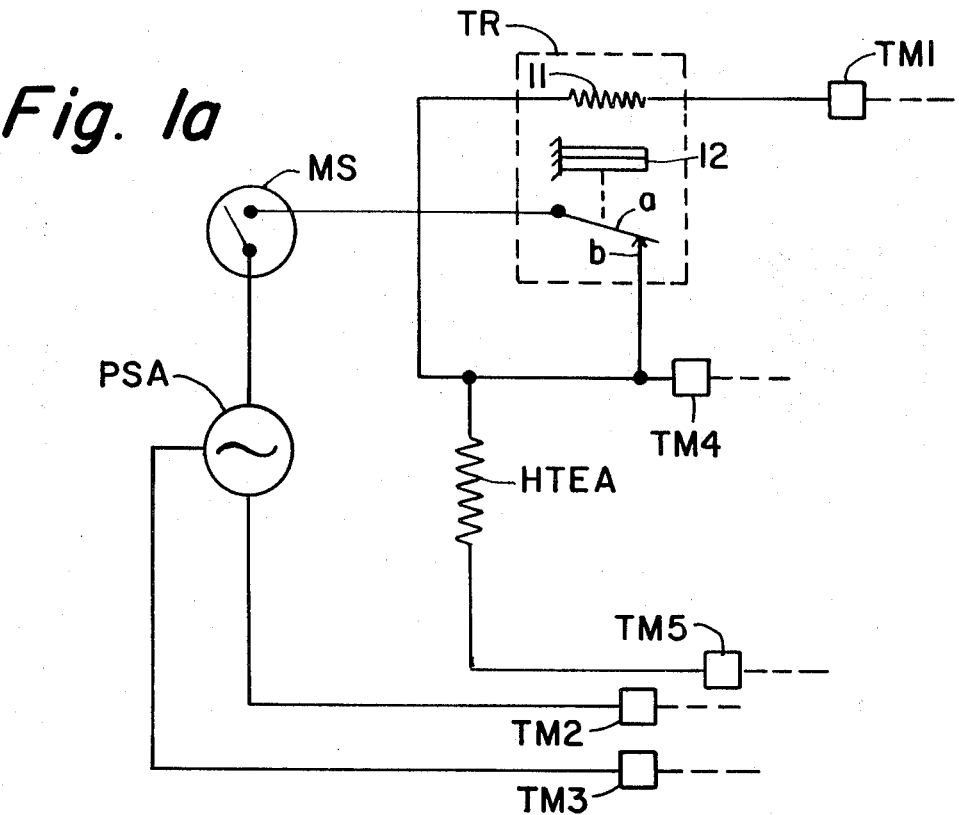
FIG. 1a comprises a schematic circuit diagram illustrating a modification of the embodiment of FIG. 1 for use with a 240 volt 60 c.p.s. alternating current source.

Referring now to FIG. 1a of the drawings, the system illustrated therein is similar to that shown in FIG. 1 with the following described exceptions. The power source PSA of FIG. 1a may, for example, comprise a commercial 240 volt, 60 c.p.s. source of alternating current and heating element HTEA of FIG. 1a is, therefore, a 240 volt element. The circuit for energizing such element extends from one terminal of such power source through switch MS in its closed position and thence over contacts a–b of relay TR to a first end of element HTEA and through such element to the second end thereof and thence to previously mentioned terminal TM5, the remainder of such energizing circuit being identical to that described for energizing element HTE of FIG. 1 except that previously mentioned terminal TM2 is connected to the second terminal of the 240 volt power source. Another or so-called neutral terminal of the 240 volt power source is connected to previously mentioned terminal TM3 rather than such terminal TM3 being connected to the above-mentioned second terminal of the power source.

In addition, said first end of heating element HTEA is connected to the previously mentioned first end of heater winding or coil 11 of relay TR rather than such end being connected to the second terminal of switch MS as shown and discussed above in conjunction with FIG. 1 of the drawings. The remainder of the circuitry of FIG. 1a, extending from terminals TM1 through TM5, is identical to that shown in FIG. 1. However, in the modification of FIG. 1a, adjustable resistor R4 is adjusted to provide a nominal 19,000 ohm resistance and potentiometer R3 is adjusted to provide a nominal 11,200 ohm resistance.

Figure 2:
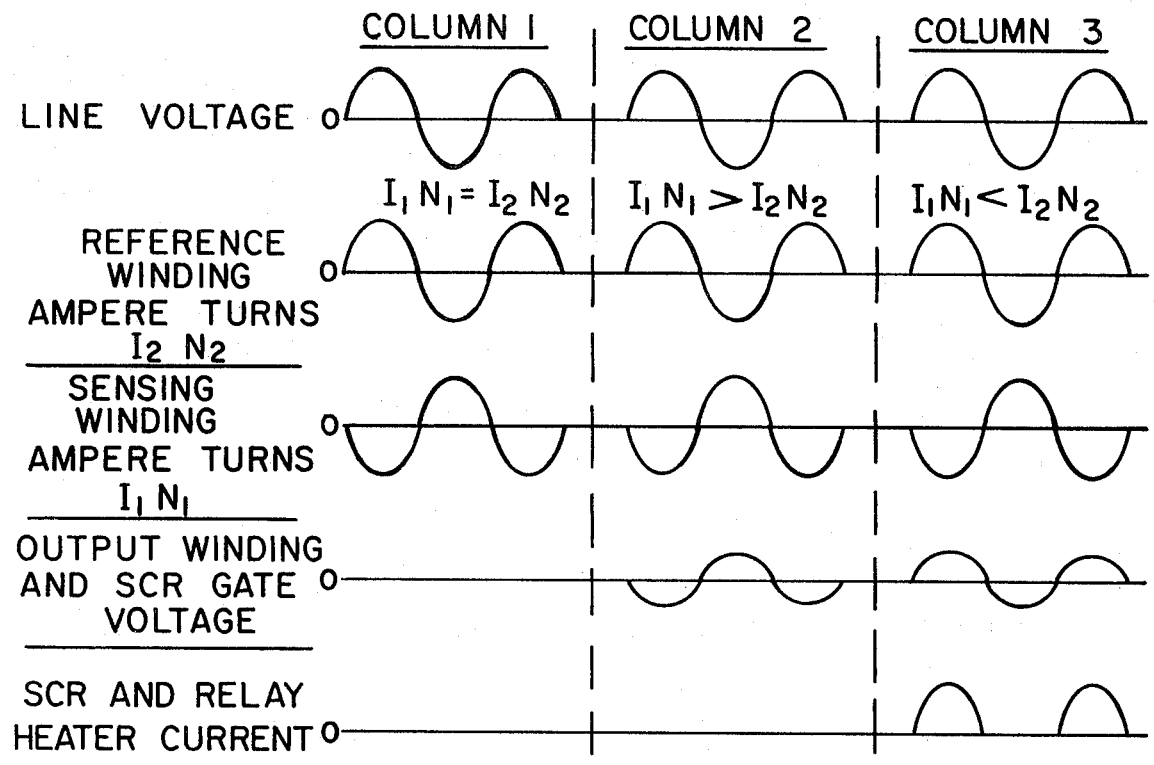
FIG. 2 is a chart illustrating several different sinusoidal waveforms occurring during operation of the control systems disclosed.

Referring now to FIG. 2 of the drawings taken in conjunction with FIG. 1, the following discussion of the operation of the inventive systems disclosed is believed to be expedient.

At a constant applied voltage, the current across an electric heating element such as HTE having a linear positive temperature coefficient of electrical resistance is inversely proportional to the integrated temperature of the heating element. This current (from power source PS) passes through winding TP2 of transformer T and the magnitude of the resultant flux is proportional to the ampere turns $I_1N_1$ of such winding. Winding TP1 comprises a relatively large number of turns $N_2$ and, if such winding is energized by a smaller current $I_2$ from said power source PS, so that $I_1N_1$ equals $I_2N_2$ with the fluxes induced by windings TP1 and TP2 being opposite to each other, that is, being 180° out of phase, as previously mentioned and as illustrated in the second and third lines of FIG. 2, then the net flux in transformer T will be zero and the voltage induced in winding TS (column 1 of the fourth line of FIG. 2) will be zero. Reference is made to said second, third and fourth lines of the sinusoidal curves shown in FIG. 2. It is believed expedient to here point out that windings TP1, TP2 and TS of transformer T are, respectively, the reference winding, sensing winding and output winding designated in FIG. 2 of the drawings.

Whenever $I_1N_1$ is not equal to $I_2N_2$, the voltage at the terminals of winding TS of transformer T will be other than zero. For example, when $I_1N_1$ is less than $I_2N_2$, (fourth line, column 3 of FIG. 2) the voltage at the gate of rectifier SCR will be in phase (fourth line of FIG. 2) with the anode voltage of rectifier SCR which is then triggered to conducting to energize heater element 11 of thermal relay TR (fifth line, column 3 of FIG. 2) because heating element HTE has reached the temperature selected or set by the setting of potentiometer R2. Contacts a–b of relay TR are actuated, following sufficient heating of element 11 of relay TR, to interrupt the supply of current to element HTE and, thereby, permit such element to cool. When $I_1N_1$ is greater than $I_2N_2$ (column 2 of FIG. 2) the voltage at the gate of rectifier SCR will be 180° out of phase (fourth line, column 2 of FIG. 2) with the anode voltage of rectifier SCR and, therefore, rectifier SCR (fifth line, column 2 of FIG. 2) is not triggered to conducting at such time because heating element HTE has not yet reached the set-point temperature selected by potentiometer R2.

The resistance network R2 through R4 represents a preferred method for varying the current $I_2$ in the 1,880 turn winding TP1 of transformer T with a minimum of total power dissipation in the network. The specific resistance values mentioned are for use with a transformer such as T and electric heating elements such as HTE or HTEA. A change in transformer turns/volt specification and/or heating element characteristics would necessitate changes in the values of the network resistances. Since the reference current $I_2$ and the element current $I_1$ are derived from the same voltage source, they both will vary, percentagewise, identically with variations in the source of voltage PS. Consequently, the control circuit exhibits nearly zero change in set point temperature over a voltage range of ± 10% of nominal line voltage. The required SCR gate trigger voltage can vary as much as 0.3 to 0.4 volts over an operating temperature range of 25° to 100° C. However, since this is relatively small compared to the change in the voltage of output winding TS as a function of element temperature in the vicinity of the set point when $I_1N_1 = I_2N_2$, the set point change is less than −10° C over the ambient temperature range from 25° to 100° C.

The foregoing discussion or description of the system of FIG. 1 is equally applicable to the modification of FIG. 1a and, therefore, no detailed operational example of such modified system is considered necessary.

Although there is herein shown and described only two forms of systems embodying the invention, it will be understood that various changes and modifications may be made therein within the purview of the appended claims without departing from the spirit and scope thereof.

What is claimed is:

1. A temperature control system comprising, in combination:
   I. a source of alternating current;
   II. an electrically operated switch including a pair of normally closed electric circuit controlling contacts and a control winding having a first end connecting with a terminal of said current source;
   III. a silicon controlled rectifier having its anode connecting with the second end of said control winding and its cathode connecting with another terminal of said current source;
   IV. an electrical resistance heating element having a linear positive temperature coefficient of electrical resistance;
   V. a transformer having first and second primary windings of a relatively large and relatively small number of turns, respectively, and a secondary winding, said primary windings being oppositely wound so as to induce magnetic fluxes of opposite phase and the ends of said secondary winding connecting across the cathode and control electrode of said rectifier such that only when the current in said first primary winding is greater than that in said second primary winding the voltage at the gate of said rectifier will be in phase with that at the anode of such rectifier;
   VI. first electrical circuit means including one contact member of said normally closed pair of contacts of said electrically operated switch connecting with said first terminal of said source of current and the second contact member of said pair of contacts connecting in multiple with a first end of said heating element and through an adjustable electrical resistance unit with a first end of said first primary winding;
   VII. second electrical circuit means connecting the second end of said heating element with a first end of said second primary winding; and
   VIII. third electrical circuit means connecting the second ends of said primary windings with each other and with another terminal of said current source.

2. A control system in accordance with claim 1 and in which said electrically operated switch is a thermal relay and the control winding of such switch is a heater element disposed in a heat transfer relationship with a bimetallic element of the switch, such element being mechanically connected with said pair of electrical circuit controlling contacts of the switch for selective actuation thereof between open and closed conditions.

3. A control system in accordance with claim 1 and in which said alternating current source is a 120 volt current source.

4. A control system in accordance with claim 1 and in which said alternating current source is a 240 volt current source.

5. A control system in accordance with claim 2 and in which said alternating current source is a 120 volt current source.

6. A control system in accordance with claim 2 and in which said alternating current source is a 240 volt current source.

* * * * *